United States Patent
Leman

(10) Patent No.: US 11,515,823 B2
(45) Date of Patent: Nov. 29, 2022

(54) CONTROL OF A SINGLE COIL BLDC MOTOR

(71) Applicant: Melexis Bulgaria Ltd., Sofia (BG)

(72) Inventor: Dirk Leman, Tessenderlo (BE)

(73) Assignee: MELEXIS BULGARIA LTD, Sofia (BG)

( * ) Notice: Subject to any disclaimer, the term of this patent is extended or adjusted under 35 U.S.C. 154(b) by 0 days.

(21) Appl. No.: 17/108,845

(22) Filed: Dec. 1, 2020

(65) Prior Publication Data

US 2021/0167712 A1 Jun. 3, 2021

(30) Foreign Application Priority Data

Dec. 3, 2019 (EP) ...................................... 19472004

(51) Int. Cl.
*H02P 6/28* (2016.01)
*H02P 23/24* (2016.01)

(52) U.S. Cl.
CPC .................................. *H02P 23/24* (2016.02)

(58) Field of Classification Search
CPC .... H02P 23/24; H02P 6/26; H02P 6/30; H02P 6/16
See application file for complete search history.

(56) References Cited

U.S. PATENT DOCUMENTS

| | | | | |
|---|---|---|---|---|
| 2013/0234633 A1* | 9/2013 | Bateman | .................. | H02P 6/26 318/400.06 |
| 2016/0111989 A1* | 4/2016 | Gohara | .................... | H02P 3/12 318/490 |
| 2016/0241172 A1* | 8/2016 | Leman | ...................... | H02P 6/26 |
| 2017/0099929 A1* | 4/2017 | Ma | ............................. | H02P 6/26 |
| 2018/0048251 A1* | 2/2018 | Leman | .................... | H02P 25/04 |
| 2018/0175756 A1* | 6/2018 | Leman | ...................... | H02P 7/04 |
| 2019/0013750 A1* | 1/2019 | Leman | ...................... | H02P 6/28 |

FOREIGN PATENT DOCUMENTS

| | | |
|---|---|---|
| CN | 108075696 A | 5/2018 |
| JP | 2010200466 A | 9/2010 |
| WO | 2018138807 A1 | 8/2018 |

OTHER PUBLICATIONS

Search Report and Written Opinion from corresponding EP Application No. EP19472004, dated May 28, 2020.

* cited by examiner

*Primary Examiner* — Muhammad S Islam
(74) *Attorney, Agent, or Firm* — Workman Nydegger

(57) ABSTRACT

A motor driver for driving a rotor of a single coil motor in a clockwise or counterclockwise rotation direction concerning a stator of the single coil motor is adapted for generating a position signal which is representative for the angular position of the rotor regarding the stator and comprises a controller which comprises a direction input to define the rotation direction of the rotor, and which is adapted for generating a driving signal for rotating the rotor in the defined rotation direction, wherein the driving signal is based on the position signal and is based on a signal indicative for an electrical lead angle wherein the signal indicative for the electrical lead angle is set such that the total lead angle is positive in both rotation directions of the rotor.

14 Claims, 6 Drawing Sheets

CONTROL OF A SINGLE COIL BLDC MOTOR

FIELD OF THE INVENTION

The invention relates to single coil motors. More specifically it relates to single coil motors which are designed to operate in clockwise and counterclockwise rotation direction.

BACKGROUND OF THE INVENTION

Single coil motors as well as their driving electronics are typically designed to run the motor in an energy efficient way in one preferred direction (e.g. when it is used for driving a fan). The design is then such that a reliable startup of that fan is achieved in the preferred direction.

Single coil motors may have stator shoe poles which are slightly asymmetrical. The asymmetry induces some reluctance offset compared to the zero torque position.

In some motor applications, as for example motors which are driving fans in air exchangers, it might be needed to start and to operate the motor either in a clockwise (CW) or in a counter clockwise (CCW) direction. The already mentioned slightly asymmetrical constructed motors might be used for that purpose.

A single coil motor may have the problem that when it is halted in the zero torque position, it might be difficult to start the motor, or it might start randomly in either CW or CCW direction.

When a single coil motor as well as its driving electronics are designed to run the motor in an energy efficient way in one preferred direction this might result in a less energy efficient way of operation in the opposite rotation direction, which might moreover be impaired by an increased noise level.

There is, therefore, a need for motor drivers and methods for driving a rotor of a single coil motor in a clockwise and counterclockwise rotation direction.

SUMMARY OF THE INVENTION

It is an object of embodiments of the present invention to provide a good motor driver for driving a single coil motor in the clockwise as well as in the counterclockwise rotation direction.

The above objective is accomplished by a method and device according to the present invention.

In a first aspect embodiments of the present invention relate to a motor driver for driving a rotor of a single coil motor in a clockwise or counterclockwise rotation direction with respect to a stator of the single coil motor. The motor driver is adapted for generating a position signal which is representative for the angular position of the rotor with respect to the stator.

The motor driver comprises a controller for generating a driving signal which has an electrical lead angle and can be defined such that the electrical lead angle can be generated such that the total lead angle is positive regardless of the direction of orientation of the motor.

The position signal may be obtained by using a magnetic sensor, such as a hall effect sensor, to determine the transition of magnetic poles on the rotor. The number of poles being a multiple of 2, typically 4 or 8.

The angular position information may be extended based on timing information related to the Electrical Half Period (EHP), which is the time between subsequent detected pole transitions.

The motor driver comprises a controller for generating a driving signal. The controller may be adapted for deriving rotor speed information from the timing information.

The controller defines a driving signal to control the voltage or current driving signal waveform to be applied by the motor driver on the motor coil, in which the driving signal is applicable for the rotor running at that detected speed, either during transitionary operation or during stable operation. The driving signal wave form defines the amplitude of the current or the voltage at a certain angle within the EHP. Typically such 1-coil waveforms are defined by a starting moment when a voltage or current is applied after a moment in which the voltage or current were 0.

The controller of the motor driver also comprises a direction input to define the rotation direction of the rotor based on the angular position signal, and such that it can determine in which direction the coil current must flow for rotating the rotor in the defined rotation direction. The current direction can be from a first output OUT1 of the motor driver to a second output OUT2 of the motor driver, or from OUT2 to OUT1, and is depending on how the coil windings are interconnected. In some motor drivers the direction input signal can be inverted to adapt for a given motor winding to result in a wanted rotation direction. In other motor drivers the interconnection or the winding direction of the motor coil have to adapted to fit with a fixed direction input setting inside the motor driver.

In embodiments of this invention, the direction input signal can be inverted. This may for example be achieved via an input pin on the motor driver package or via an internal generated signal. The invention is, however, not limited thereto. In case of an internal generated signal the change of direction may for instance be time based (every minute, every hour, . . . ), or the rotation direction may for example be selected such that after each start up the motor is spinning in one direction during a shorter predefined time before spinning in the other direction for a longer time, for instance to blow out dust which might have been collected on the fan motor input during previous suction operation.

In prior art 1-coil motordrivers the lead angle is defined by the position of the hall sensor compared to the stator. In such prior art motors the hall sensor is preferably positioned such that the hall sensor detects the pole transition slightly before the poles are aligned with the stator shoes for a target rotation direction. Such position is referred to as a positive lead angle, and typically results in a more efficient and lower noise operation of the motor.

However, such Hall sensor position will result in the detection of the pole transition slightly after the poles are aligned with the stator shoes for the opposite rotation direction. Such position is referred to as a negative lead angle, and typically results in a lower efficient and more noisy operation of the motor.

In embodiments of this invention the total lead angle is the sum of the lead angle of the position signal (e.g. the hall sensor position based lead angle, defined by the hall sensor position compared to the stator), plus an electrical lead angle, which is added by the controller, based on speed information as obtained from the position signal. Optionally such electrical lead angle adjustment may also be function of other parameters, such as speed, motor current, motor driver temperature, motor coil inductance, motor coil resistance, etc.

In embodiments of the invention the hall sensor may be located in the middle between two stator shoes. In such case the hall sensor based lead angle equals zero. In such case the electrical lead angle may or may not be the same in either direction. If the electrical lead angle (and thus the total) is positive in one direction, the same electrical lead angle will result in a positive electrical (and thus total) lead angle in the other direction. It is a preferred embodiment to have the hall sensor based lead angle substantially zero, for instance smaller than 5 electrical degrees, or even smaller than 1 electrical degree. Since time information can only be obtained after at least one rotation, and since time information is not reliable during initial EHPs due to fast acceleration of the motor, the generation of an electrical lead angle is difficult or at least not optimal during the first few EHPs. A significant hall sensor based positive lead angle in one rotation direction could still affect the motor operation during initial start up in the opposite direction.

It is an advantage of embodiments of the present invention that the electrical lead angle can be defined such that the total lead angle is positive regardless of the rotation direction. Also in case the hall sensor lead angle is not zero, the electrical lead angle can be generated such that a positive total lead angle is applied in either direction of rotation of the motor.

Another advantage of embodiments of the present invention is the possibility to apply different total lead angles depending on the rotation direction of the motor. Thus peaks in the resulting driving current through the coil after changing the rotation direction can be reduced, compared to a motor driver for which the electrical lead angle is not set in function of the rotation direction.

This allows to optimize the operation of the motor both in clockwise as well as in counterclockwise operation. The electrical lead angle may be positive or negative (the latter resulting in lag). In embodiments of the present invention the signal indicative of the electrical lead angle may be the lead time.

In embodiments of the present invention the electrical lead angle is programmable. In embodiments of the present invention the controller may comprise a wave form generator for generating the driving signal.

In embodiments of the present invention the controller comprises a lead angle generator for controlling the electrical lead angle of the driving signal in function of the rotation direction of the rotor.

In embodiments of the present invention the lead angle generator is configured for adjusting the position signal and the wave form generator is adapted for generating the driving signal synchronous with the adjusted position signal.

In embodiments of the present invention the signal indicative of the electrical lead angle is obtained by electrically adjusting the position signal (e.g. the Hall sensor based lead angle) in function of the rotation direction of the rotor and the controller is adapted for generating the driving signal based on the adjusted position signal such that the total lead angle is positive in both rotation directions. Therefore the electrical lead angle may be set in function of the rotation direction. By adjusting the position signal, the electrical lead angle may be adjusted. This may be done in function of the rotation direction.

It is an advantage of embodiments of the present invention that the total lead angle of the driving signal can be adjusted by electrically adjusting (delaying or advancing) the periodic position signal.

In embodiments of the present invention at least one signal which is indicative for the electrical lead angle is predefined for each rotation direction.

In embodiments of the present invention the motor driver comprises an interface for retrieving the predefined signals, which are indicative for the electrical lead angles, from an external device.

For each rotation direction the signal which is indicative for the electrical lead angle (e.g. the electrical lead angle itself) may for example be stored in an external E2PROM.

In embodiments of the present invention the motor driver comprises an internal memory for retrieving the predefined signals which are indicative for the at least on electrical lead angle.

In embodiments of the present invention the one or more signals which are indicative for the electrical lead angles are determined based on one or more parameters that give an indication of the ratio of the resistance and inductance of the rotor.

The total resistance and inductance seen by the driving current may be considered. This comprises the resistance and inductance of the coil. In embodiments of the present invention the predefined electrical lead angles are determined before starting the motor.

In embodiments of the present invention the at least one signal which is indicative for the electrical lead angle is determined based on the speed of the rotor.

A look up table in function of the speed may be used to define the at least one signal which is indicative for the electrical lead angles. This look up table may for example exist for the clockwise and for the counterclockwise direction. In alternative embodiments the mathematical relationship between the signals which are indicative for the electrical lead angles in the clockwise direction and the signals which are indicative for the electrical lead angles in the counterclockwise direction may be defined.

In embodiments of the present invention at least part of the at least one electrical lead angle may be scaling as a function of the motor speed.

In embodiments of the present invention the one or more lead angles may be determined based on a combination of the one or more parameters that give an indication of the ratio of the resistance and the inductance of the rotor and the speed.

In embodiments of this invention, the at least one electrical lead angle may be defined during operation from analyzing the current wave form, for instance analyzing the height of the peaks in the waveform at the start and at the end of the EHP.

In embodiments of the present invention the position sensor is a magnetic sensor. The magnetic sensor may for example be a Hall sensor.

In embodiments of the present invention the Hall sensor is positioned at a substantially zero magnetic lead angle.

It is an advantage of embodiments of the present invention that electrical adjustments of the position signal between the clockwise and the counterclockwise direction are reduced compared to a motor driver for which the Hall sensor is not positioned at the zero magnetic lead angle.

In preferred embodiments of the present invention the magnetic lead angle may for example range between +/−1 degree, or even between +/−5 degree, or even between +/−10 degree. In the first case the electrical adjustment of the position signal may for example be 10 degree. In case of a magnetic lead angle of +5°, the electrical adjustment of the position signal may for example be +5° in one rotation direction and −15° in the opposite rotation direction.

In embodiments of the present invention the Hall sensor is positioned such that no substantial electrical lead angle adjustment is needed in one rotation direction (e.g. a lead angle adjustment of less than 1°, or even less than 0.1°, or even no lead angle adjustment).

It is an advantage of embodiments of the present invention that only in one direction an electrical lead angle adjustment is required. For example, the position signal only needs to be adjusted in one rotation direction. The magnetic lead angle may for example be 10° in one rotation direction, and a compensating electrical lead angle of 20° may be introduced in the opposite rotation direction. The signal indicative for the electrical lead angle may thereby be obtained by shifting the position signal over 20°.

In embodiments of the present invention the controller comprises a wave form generator for generating the driving signal.

In a second aspect embodiments of the present invention relate to a motor system. The motor system comprises a single coil motor which comprises a rotor and a stator. The motor system moreover comprises a motor driver, according to embodiments of the present invention, for driving the rotor of the single coil motor in a clockwise or counter-clockwise direction with respect to the stator.

In a third aspect embodiments of the present invention relate to a method for driving a rotor of a single coil motor in a clockwise or counterclockwise rotation direction with respect to the stator. The method comprises:
  generating a position signal which is representative for the angular position of the rotor with respect to the stator,
  defining a desirable rotation direction,
  generating a driving signal for rotating the rotor in the defined rotation direction, wherein the driving signal is based on the position signal and on a signal which is indicative for an electrical lead angle, wherein the signal indicative for the electrical lead angle is set in function of the rotation direction of the rotor.

In embodiments of the present invention the method comprises:
  electrically adjusting the position signal when changing the rotation direction of the rotor, generating the driving signal based on the adjusted position signal such that the electrical lead angle is changing due to changes in the adjusted position signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
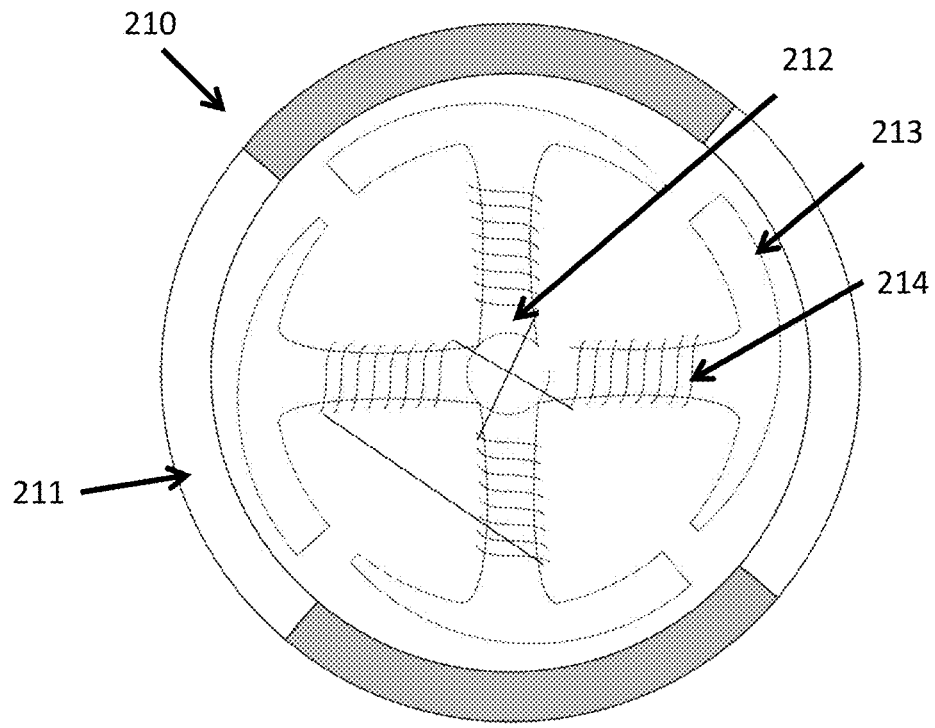
FIG. 1 shows a schematic drawing of a single coil motor.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a Hall effect sensor, reference is made to any kind of magnetic sensor, such as but not limited to a Magneto-Resistive sensor, or an Inductive sensor.

Where in embodiments of the present invention reference is made to the driving signal, reference is made to the signal which generates a current through the motor coil of the single coil BLDC motor. The current may be generated by an average voltage difference over the motor coil generated by an output driver (e.g. a full bridge output driver). The driving signal may be a pulse width modulated (PWM) signal, or a linear controlled signal.

The average voltage difference across the motor coil in case of an embodiment with supply VDD, may be anywhere between 0V and VDD. The current scales up accordingly.

In a PWM driving method, the voltage is provided in a time interrupted way resulting in an average voltage difference over the coil. When neglecting resistive losses in the bridge driver and the motor coil of the single coil BLDC motor, the average voltage difference is 12V when driving the motor with a supply voltage VDD=12V and a DCout=100% PWM. With e.g. a DCout=50% PWM driving signal the average voltage difference is 6V over the coils. Also, when applying the PWM driving method the phase current scales up accordingly, and can be represented at any time as Icoil(t)=(VDD*DCout(t)−BEMF(t))/Z, in which Z is the impedance of the bridge driver and the motor coil, and in which BEMF is the Back Electromotive Force voltage induced into the coil by the rotating permanent magnets on the rotor.

Where in embodiments of the present invention reference is made to the lead angle or lead time, reference is made to the relationship in angle or time between the starting position and the corresponding pole position. In the remaining of this patent description the term lead angle refers to lead angle or lead time.

Where in embodiments of the present invention reference is made to a signal which is indicative for an electrical lead angle, reference is made to a signal which allows the controller to generate the driving signal with a specific electrical lead angle. The driving signal may be such that the total lead angle is positive for both rotation directions. The driving signal may be generated relative to the position signal such that the driving signal is leading the BEMF with the lead angle.

Where in embodiments of the present invention reference is made to the zero magnetic lead angle, reference is made to the angle at which no force is applied to the rotor when applying a current through the coils. This is also referred to as the N/S zero crossing of the magnetic poles in the rotor. If the position sensor generates a position signal which is zero when the rotor is at this position, the position sensor is at the zero magnetic lead angle.

Where in embodiments of the present invention reference is made to the magnetic lead angle, reference is made to the angle with which the zero crossing of the position signal is leading the N/S zero crossing of the magnetic poles in the rotor.

In a first aspect embodiments of the present invention relate to a motor driver 100 for driving a rotor 211 of a single coil motor 210 in a clockwise or counterclockwise rotation direction with respect to a stator 212 of the single coil motor 210.

The motor driver 100 is adapted for generating a position signal which is representative for the angular position of the rotor 211 with respect to the stator 212. It may therefore comprise a position sensor 110 or a component which implements a sensor-less method with what the rotor position can be retrieved and the position signal can be generated.

The motor driver comprises a controller 120. The controller 120 comprises a direction input 150 to define the rotation direction of the rotor 211. The controller 120 is adapted for generating a driving signal for rotating the rotor in the defined rotation direction. The driving signal is generated based on the position signal and based on a signal which is indicative for an electrical lead angle wherein the signal indicative for the electrical lead angle is set in function of the rotation direction of the rotor 211.

As will be illustrated later on, peaks in the resulting driving current through the coil can be reduced by generating a driving signal based on a signal which is indicative of the electrical lead angle and which is set in function of the rotation direction of the rotor, compared to a motor driver for which the electrical lead angle is not set in function of the rotation direction.

In embodiments of the present invention the signal indicative of the electrical lead angle is obtained by electrically adjusting the position signal in function of the rotation direction of the rotor. The signal may thereby be delayed or advanced in function of the position signal. The change in electrical lead angle may for example range between 0 and 10 electrical degree, for high inductance motors this may increase up to 22 electrical degree, or even 35 electrical degree. The controller is thereby adapted for generating the driving signal based on the adjusted position signal such that the lead angle is changing due to the adjusted position signal.

FIG. 1 shows a schematic drawing of a single coil motor 210. The motor comprises a rotor 211 with permanent magnets, and a stator 212 comprising stator shoes 213. The motor coil 214 is present on the stator shoes. The straight lines interconnecting the coils are drawn in a schematic way. In reality the coils may have multiple layers going up and down on a stator pole and interconnect around the bearing.

Figure 2:
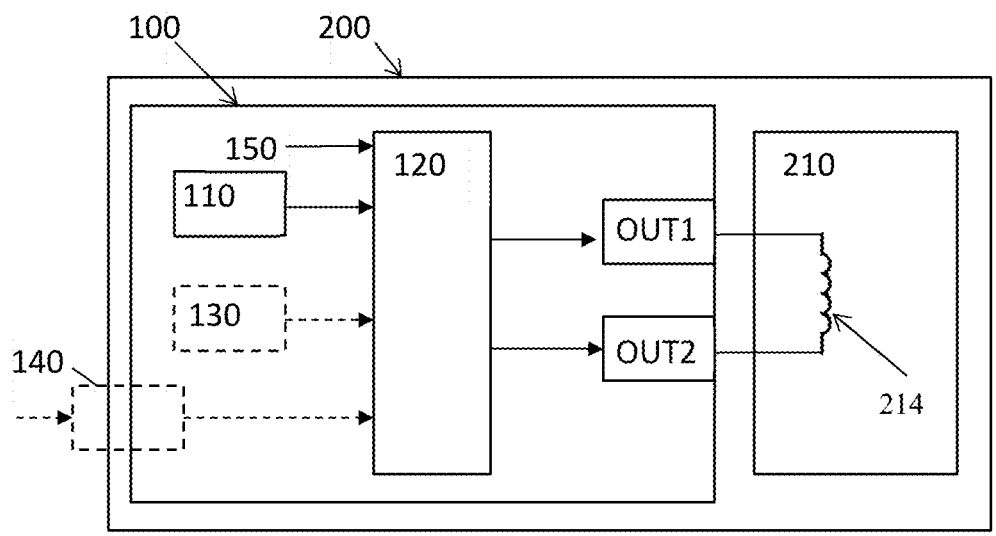
FIG. 2 shows a block diagram of a motor driver in accordance with embodiments of the present invention.

FIG. 2 shows a block diagram wherein the different components of a motor driver 100 in accordance with embodiments of the present invention are illustrated. This figure shows the controller 120. The controller 120 comprises a direction input 150 to define the rotation direction of the rotor 211. This input can be an input pin controlled by an external input source, or an internal signal. The internal signal may for example be configured such that the orientation direction is changed at specific time stamps, for example with a certain periodicity (for example every few minutes).

In the example of FIG. 2, the component 110 is a position sensor adapted for generating a position signal which is representative for the angular position of the rotor 211 with respect to the stator 212. This may for example be a Hall sensor. FIG. 2 also shows the single coil output drivers OUT1 and OUT2, which define the direction in which the current flows through the motor coil 214. The rotation direction is defined by the combination of the hall sensor position, the winding of the motor coil 214 on the stator 212, the asymmetry of the stator shoes 213, and how the current flows through the motor coil 214 during the first EHP at start up. The direction of the rotation for a given motor design is inversed by inversing the direction of the current during the first EHP at start up.

In embodiments of the present invention at least one signal which is indicative for the electrical lead angle may be predefined for each rotation direction. This may for example be done in the component 130. The component 130 is an optional component. It is an internal memory in which predefined electrical lead angles (or signals indicative for the electrical lead angles) may be stored. These electrical lead angles (or indicative signals thereof) can be retrieved by the controller. Alternatively, or in combination therewith, the controller may be adapted for retrieving the predefined electrical lead angles (or indicative signals thereof) from an external device through the interface 140. In embodiments of the present invention the one or more signals which are indicative for the electrical lead angles are determined based on one or more parameters that give an indication of the ratio of the resistance and inductance of the rotor, the shape of the current wave form during an EHP while the rotor is rotating, the motor speed, etc. For instance, the rise time of a pulse can be such an indication. Such a test pulse may for example be applied before starting the motor.

In embodiments of the present invention the signal indicative of the electrical lead angle of the driving signal may be defined as a fixed angle, or a fixed time, or a variable angle or time. The signal may be defined as a function of speed, current, or current shape. The signal indicative of the electrical lead angle may be set depending on the rotation direction of the motor, or the rotation direction in which the motor should be started. The advantage of defining the total lead angle by applying an electrical lead angle will be illustrated with the graphs of FIG. 3 to FIG. 8.

The controller itself is adapted for generating the driving signal for the motor 210. A complete motor system 200 according to a second aspect of the present invention, comprising a motor 210 and a motor driver 100 in accordance with embodiments of the present invention is also illustrated in FIG. 2.

Figure 3:
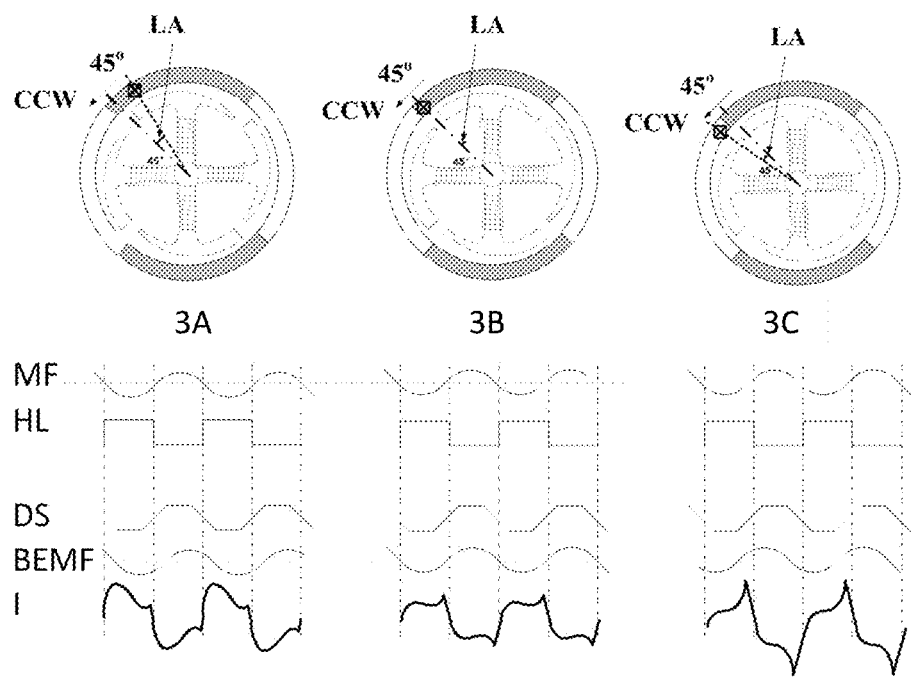
FIG. 3 shows position signals, the driving signal, the BEMF voltage, and the coil current for different positions of the position sensor.

In the example of FIG. 3 the driving signal is generated in function of the position signal generated by the Hall sensor. By changing the position of the Hall sensor a positive lead or a negative lead (or lag) angle of the current wave form with respect to the BEMF induced in the motor coil can be created. In the example of FIG. 3, the shape of the motor current is shown for different Hall sensor positions compared to the stator shoe poles. As indicated by the arrows, in FIGS. 3A, 3B, and 3C the rotation direction is the CCW direction.

In FIG. 3A, the hall sensor is positioned in a positive leading position (with magnetic lead angle LA) compared to the zero magnetic lead angle. The zero magnetic lead angle is the angle at which the current or voltage wave form zero crossing is aligned with the BEMF zero crossing when applying a current or voltage through the coils. In this example the hall latch is positioned in a positive leading position compared to the 45 degree (mechanical) point. Mind that the 45 mechanical degree point corresponds to 90 electrically degree, for a 2 pole pair motor as show in these figures.

In FIG. 3A, the hall sensor is positioned in a leading position compared to the zero magnetic lead angle meaning that the N/S zero crossing of the magnetic poles in the rotor is passing over the hall sensor before it crosses the 45 degree mechanical point.

In FIG. 3B the hall sensor is located exactly at the zero magnetic lead angle LA (in this example the 45 mechanical degree position, i.e. in the middle between two stator shoes).

In FIG. 3C the hall sensor is located with a lag angle LA compared to the zero magnetic lead angle (in this example the 45 mechanical degree position).

From top to bottom, the following graphs are shown in FIG. 3 (all in function of time): the magnetic field MF at the Hall sensor location, the Hall latch output HL with a 0 mT switching point, the voltage drive waveform DS (which is applied such that it is in phase with the magnetic field at the Hall sensor location), the back electromotive force voltage (BEMF) induced into the motor coil, and the eventual motor current I.

As can be seen from these graphs, the eventual motor current shape is different depending on the hall sensor location versus the zero magnetic lead angle. The motor current shape is influenced by the voltage drive wave form, the motor inductance, the motor speed, the mechanical load, and others.

Figure 4:
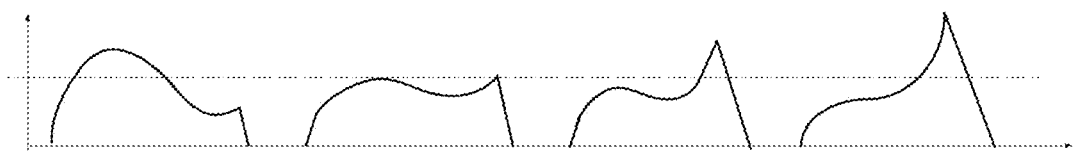
FIG. 4 shows detailed current profiles for different positions of the position sensor.

In case the rotor should only rotate in one rotation direction, the optimal position of the hall sensor compared to the zero magnetic lead angle can be found by positioning the hall sensor with a small magnetic lead angle and evaluate the shape of the current. Based on the current shape it can be decided to further increase the magnetic lead angle or reduce the magnetic lead angle. Typical shapes of current are shown in FIG. 3 for different magnetic lead angles. FIG. 4 shows these current profiles in more detail for, from left to right, a magnetic Hall sensor which is positioned with a large magnetic lead angle, an optimal magnetic lead angle, a small magnetic lag angle, and a large magnetic lag angle.

The shape of the current at the optimal magnetic lead angle position offers several benefits compared to the other shapes. This current shape may offer a higher efficiency, a lower acoustic noise, lower vibrations, etc.

Figure 5:
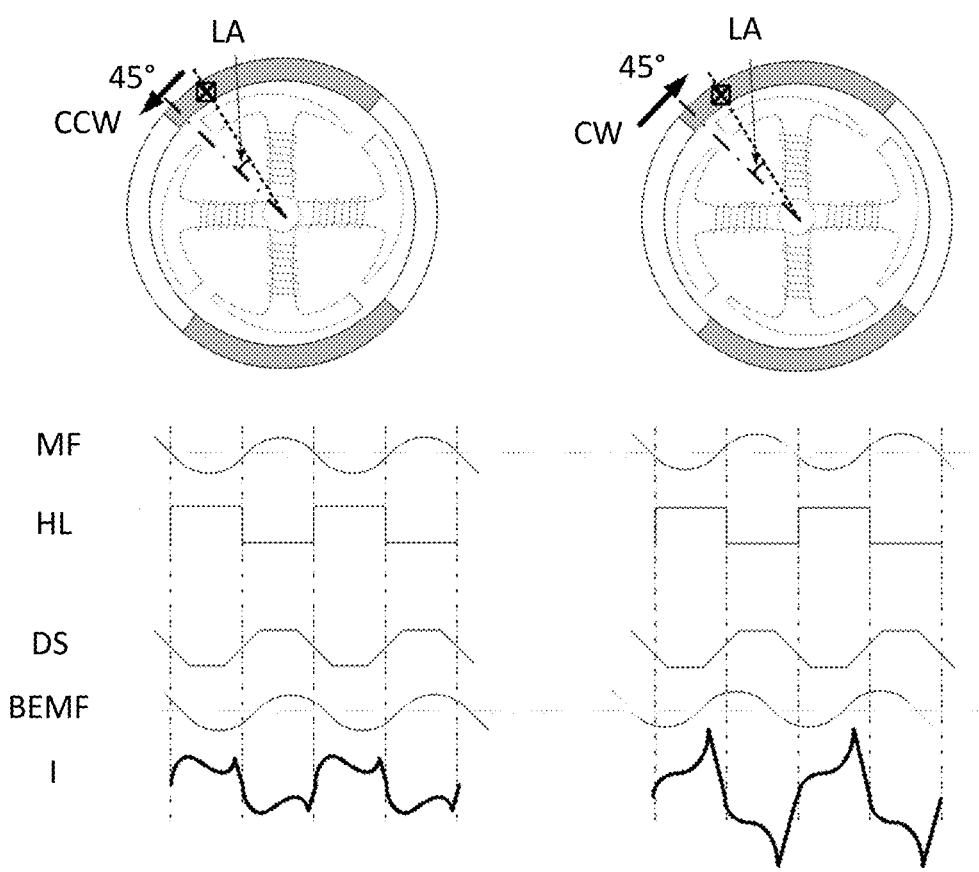
FIG. 5 illustrates how the optimal magnetic lead angle in the CCW direction not necessarily is the optimal magnetic lead angle in the CW direction.

As can be seen from FIG. 5, the optimal magnetic lead angle in the CCW direction (left drawings) not necessarily is the optimal magnetic lead angle in the CW direction (right drawings). In FIG. 5 the driving signal is in phase with the position signal of the Hall sensor. In the left part of FIG. 5 this results in a driving signal which is leading the BEMF induced into the motor coil. This results in an optimal shape of the motor current in the CCW direction. When inverting the rotation direction, however, the driving signal is lagging the BEMF induced into the motor coil. This results in peaks in the motor current when operating in the CW direction.

Figure 6:
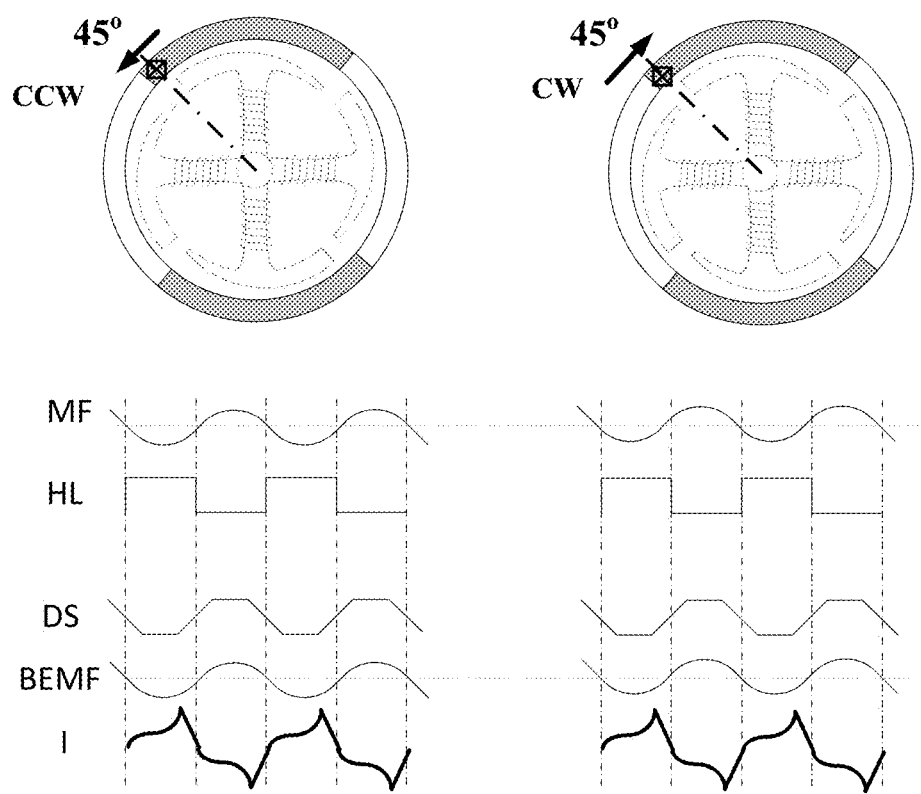
FIG. 6 shows the current shapes in the CCW and CW direction when the Hall sensor is positioned at the zero magnetic lead angle position.

The graphs in FIG. 6 show the result when moving the Hall sensor at the zero magnetic lead angle position. This results in a current shape which is similar in both directions. The current shape shows a lag angle in both directions which is caused by delay in the current wave form compared to the applied voltage wave form due to the motor coil inductance. In both directions the fan will have reduced efficiency, and increased acoustic noise/vibrations compared to an optimal design.

In embodiments of the present invention the driving signal is generated such that it has an electrical lead angle with respect to the position signal in function of the rotation direction of the rotor. The driving signal may be generated in phase with a signal indicative of the electrical lead angle. The signal indicative of the electrical lead angle may be obtained by delaying or advancing the position signal. As a result, the lead angle can be changed by delaying or advancing the position signal with the same lead or lag as the lead or lag adjustments of the position signal. The position signal may be an analog or a digital position signal.

Figure 7:
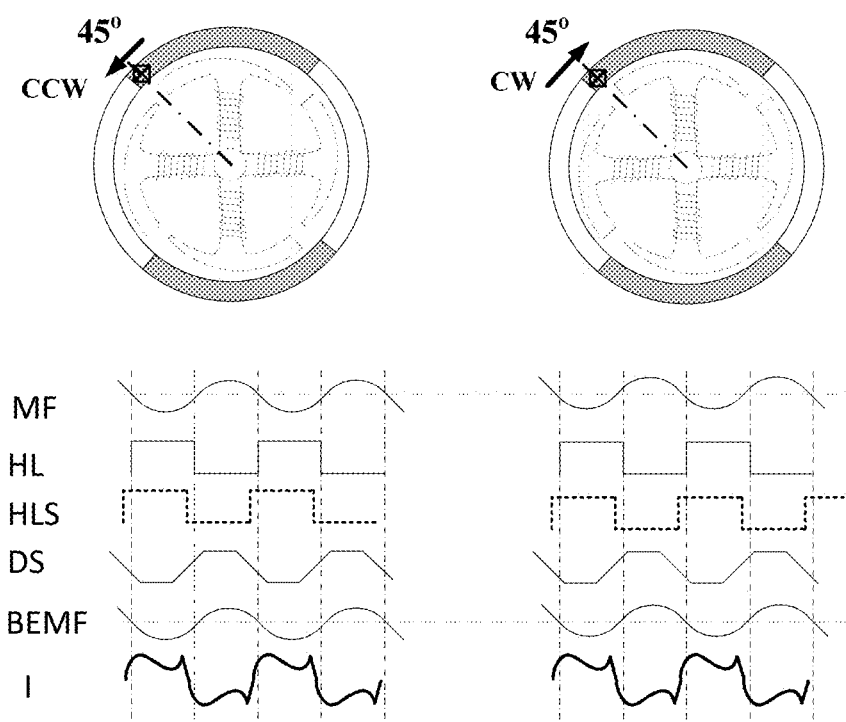
FIG. 7 shows the current shapes in the CCW and CW direction which are obtained by a signal indicative of the lead angle which is obtained by advancing the position signal in function of the rotation according to embodiments of the present invention.

A preferred embodiment thereof is illustrated in FIG. 7. From top to bottom the following signals are shown: the magnetic field MF at the Hall sensor location, the Hall latch output HL with 0 mT switching point, the shifted Hall latch output HLS, the BEMF voltage, and the resulting current I. In this example the position sensor is positioned at the zero magnetic lead angle position. The signal HLS indicative of the electrical lead angle is obtained by advancing the position signal HL over a period such that a desirable electrical lead angle is obtained for the driving signal. In this example the position signal is the Hall latch output with a 0 mT switching point. In this example both in the CW and in the CCW direction an electrical lead angle is introduced for obtaining the total lead angle. By doing so the lag angle due to the hall sensor lead angle is compensated by introducing an electrical lead angle in both directions. This electrical lead angle may be adapted in function of the rotation direction. It is therefore an advantage of embodiments of the present invention that a controller in accordance with embodiments of the present invention is adapted for defining the electrical lead angle of the driving signal in function of the rotation direction of the rotor.

Figure 8:
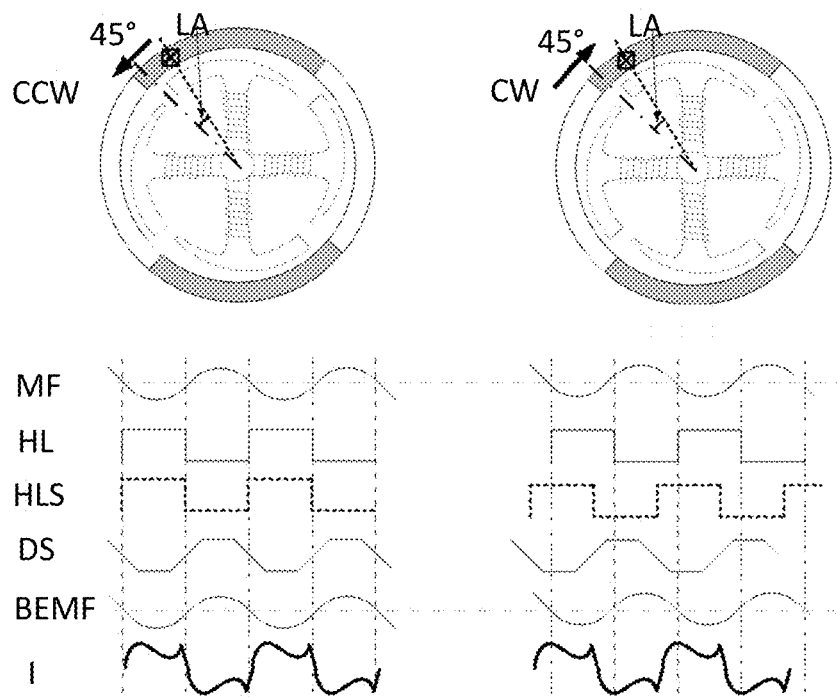
FIG. 8 shows the current shapes in the CCW and CW direction which are obtained by a signal indicative of the electrical lead angle which is obtained by advancing the position signal in function of the rotation according to embodiments of the present invention, wherein the lag angle in the CW direction is compensated by applying an electrical lead angle.

FIG. 8 shows the traces resulting from a motor driver according to an alternative embodiment of the present invention. In this example the hall sensor is positioned such that no electrical lead angle is required in the CCW direction for optimizing the motor current. Therefore, the Hall sensor is positioned with a small lead angle in the CCW direction. The magnetic lead angle may for example be 2 degrees, or even 5 degrees, or even 10 degrees.

When changing the rotation direction of the rotor in this example in the CW direction this results in a big lag angle which is, according to embodiments of the present invention, compensated by applying an electrical lead angle.

Figure 9:
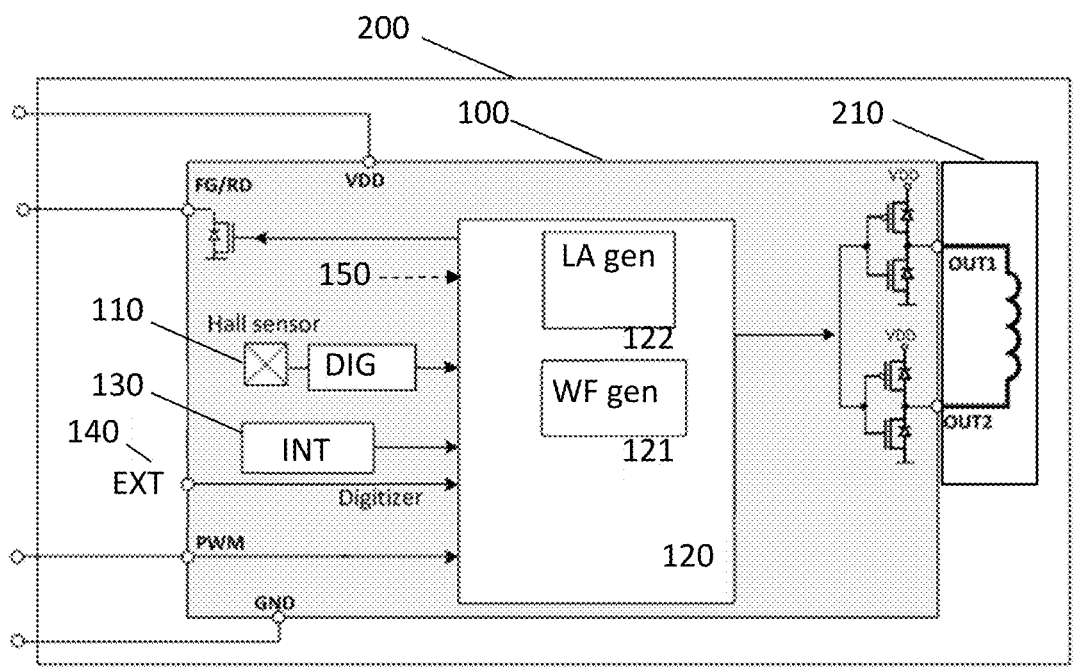
FIG. 9 shows a block diagram of a motor driver in accordance with embodiments of the present invention.

FIG. 9 shows a schematic drawing of a motor driver and of a motor system 200 in accordance with embodiments of the present invention. In FIG. 2 a more generic schematic drawing is shown, this drawing shows more detailed possible implementation details. The single coil motor 210 is schematically drawn. The driving transistors of the output drivers OUT1 and OUT2 are controlled by a driving signal generated by the controller 120.

The controller 120 comprises a lead angle generator 122 for controlling the electrical lead angle of the driving signal in function of the rotation direction of the rotor. This lead angle generator 122 may for example be configured for adjusting the position signal. In that case the wave form generator 121 may be adapted for generating the driving signal synchronous with the adjusted position signal.

The controller 120 comprises an output for outputting an FG/RD signal.

In this example the motor driver 100 comprises a position sensor 110 which is a Hall sensor. The Hall sensor analog signal is digitized before submitting it to the controller 120.

The controller 120 receives optionally additional inputs from internal memory 130 (e.g. E2PROM) or through an external interface 140 (e.g. using a resistor or other discrete configurations) and defines the wave form, and either shifts the waveform over an additional time or number of electrical degrees depending on the configuration, or updates the waveform to reflect the electrical lead angle. This adjustment is done in function of the selected rotation direction and may be changing when changing the rotation direction. The direction can either be communicated through the PWM input, through some encoding, or through an external (for instance a dedicated input pin 150) or internal input (e.g. reprogramming of internal registers or E2PROM).

In embodiments of the present invention the controller may be adapted for setting the electrical lead angle as function of the speed, the current or other parameters. In embodiments of the present invention the electrical lead angle may be calculated by the controller based on actual measurements, for instance of the motor coil inductance or L/R. Since the motor coil contains an inductance, any applied voltage shape will result with some delay in a current shape. Such delay may become significant when the commutation speed approaches the delay timing. Therefore, as speed increases, the applied voltage shape is shifted forward compared to the rotor position.

For optimal efficiency the lead angle should increase as the mechanical commutation speed approaches the delay of the current versus the speed. Alternatively, a fixed lead time may be used, in which automatically as speed increases, the time is converted in a progressive angle.

In some cases, it is desired that the lead angle increases more than proportionally and a reduction in efficiency is exchanged for some additional peak power.

For starting the motor different startup methods may be applied. The controller may be adapted for applying a soft start method in one direction to minimize the inrush current (which causes audible noise and puts mechanical stress on the fan construction, thus limiting fan life time), and a more aggressive start in the opposite direction in order to jump over the zero torque position, and then fall back on the smoother start up.

A controller according to embodiments of the present invention may be adapted for starting up the motor in the CW or CCW direction.

In order to start up the fan in both directions, a modification may be implemented in the startup sequence of a controller in accordance with embodiments of the present invention. When the rotor of a motor with asymmetrical shoe poles is stopped close to the zero torque position, more current must be injected in order to jump over the zero torque point, compared to the other rotation direction.

Such an adjustment may be implemented in the controller 120. The lead angle generator 122 may for example be adapted for increasing or decreasing the signal which is indicative for the electrical lead angle. This may for example be achieved by delaying or advancing the position signal.

The motor driver may for example have two output pins OUT1 and OUT2 which can be connected with the single coil of the motor. When starting up, the controller may for be adapted for driving the motor according to the following table.

| Rotor polarisation at the stop position of the hall sensor | Magnetic field strength detected by Hall sensor | OUT 1 | OUT2 | Direction |
|---|---|---|---|---|
| South pole | $B > B_{OP}$ | Low | High | CW |
| North pole | $B < B_{RP}$ | High | Low | CW |
| South pole | $B > B_{OP}$ | High | Low | CCW |
| North pole | $B < B_{RP}$ | Low | High | CCW |

This table is only an example and depends on the winding connection of the motor. In this example the position sensor is a Hall sensor, and the thresholds $B_{op}$ and $B_{RP}$ are defined for determining how to start the motor. For starting up the motor, the controller may be configured such that when the Hall sensor detects a magnetic field $B>B_{op}$ the controller generates a driving signal such that OUT1 goes low, and OUT2 is the phase that goes high. This is illustrated by the first row in the table. For applications which include variable speed control, OUT2 can be controlled with a DCout output duty cycle. In this example the current flows in a first direction through the coil, such that the motor spins in CW direction due to electromagnetic interaction between the rotor magnet and the current through the stator coil.

According to the second row in this table the controller generates a driving signal such that when B<Brp, OUT2 goes low, and OUT1 goes high, causing the current to flow in the opposite direction. Since the rotor magnet is opposite as well the rotor will spin again in the CW direction.

In case the rotor should spin in the CCW direction, the reaction of the controller is adapted such that it generates a driving signal such that For B>Bop, OUT2 goes low, and OUT1 goes high. And for B<Brp, OUT1 goes low and OUT2 goes high.

It is an advantage of embodiments of the present invention that an improved start and operation both in clockwise as in counterclockwise rotation direction can be achieved.

In a third aspect embodiments of the present invention relate to a method for driving a rotor of a single coil motor in a clockwise or counterclockwise rotation direction with respect to the stator. The method comprises:

generating a position signal which is representative for the angular position of the rotor with respect to the stator, defining a desirable rotation direction, generating a driving signal for rotating the rotor in the defined rotation direction, wherein the driving signal is based on the position signal and on a signal which is indicative for an electrical lead angle wherein the signal indicative for the electrical lead angle is set such that the total lead angle, which is the sum of the lead angle of the position signal and the electrical lead angle, is positive for both rotation directions of the rotor. In embodiments of the present invention the electrical lead angle is set in function of the rotation direction of the rotor.

In embodiments of the present invention the method comprises:

electrically adjusting the position signal in function of the rotation direction of the rotor, generating the driving signal based on the adjusted position signal such that the electrical lead angle is changing due to changes in the adjusted position signal.

In embodiments of the present invention the signal which is indicative for the electrical lead angle is obtained by delaying or advancing the position signal.

The invention claimed is:

1. A motor driver for driving a rotor of a single coil motor in a clockwise or counterclockwise rotation direction with respect to a stator of the single coil motor, the motor driver being adapted for generating a position signal which is representative for an angular position of the rotor with respect to the stator wherein a lead angle of the position signal is the angle with which a zero crossing of the position signal is leading a north/south zero crossing of magnetic poles in the rotor, and comprising a controller which comprises a direction input to define the rotation direction of the rotor, and which is adapted for generating a driving signal for rotating the rotor in the defined rotation direction, wherein the driving signal is generated such that it has an electrical lead angle with respect to the position signal in function of the rotation direction of the rotor and is based on a signal which is indicative for the electrical lead angle, wherein the signal indicative for the electrical lead angle is set such that a total lead angle, which is a sum of the lead angle of the position signal and the electrical lead angle, is positive for both rotation directions of the rotor, wherein the at least one signal which is indicative for the electrical lead angle is predefined for each rotation direction.

2. The motor driver according to claim 1, wherein the signal indicative of the electrical lead angle is obtained by electrically setting the position signal in function of the rotation direction of the rotor and wherein the controller is adapted for generating the driving signal based on the position signal such that the electrical lead angle is set by the position signal.

3. The motor driver according to claim 1, the motor driver comprising an interface for retrieving the predefined signals, which are indicative for the electrical lead angles, from an external device.

4. The motor driver according to claim 1, the motor driver comprising an internal memory for retrieving the predefined signals which are indicative for the electrical lead angles.

5. The motor driver according to claim 1, wherein the one or more signals which are indicative for the electrical lead angles are determined based on one or more parameters that give an indication of the ratio of the resistance and inductance of the rotor.

6. The motor driver according to claim 1, wherein the at least one signal which is indicative for the electrical lead angle is determined based on a speed of the rotor.

7. The motor driver according to claim 1, wherein the position signal is generated by a position sensor which is a magnetic sensor.

8. The motor driver according to claim 1, wherein the controller comprises a wave form generator for generating the driving signal.

9. A motor system, comprising a single coil motor which comprises a rotor and a stator, the motor system comprising a motor driver according to claim 1, for driving the rotor of the single coil motor in a clockwise or counterclockwise direction with respect to the stator.

10. The motor driver according to claim 5, wherein a Hall sensor is positioned such that no substantial electrical lead angle adjustment is needed in one rotation direction.

11. The motor driver according to claim 6, wherein a Hall sensor is positioned at a substantially zero magnetic lead angle.

12. A method for driving a rotor of a single coil motor in a clockwise or counterclockwise rotation direction with respect to a stator, the method comprising:
- generating a position signal which is representative of an angular position of the rotor with respect to the stator, wherein a lead angle of the position signal is the angle with which a zero crossing of the position signal is leading a north/south zero crossing of magnetic poles in the rotor,
- defining a desirable rotation direction,
- generating a driving signal for rotating the rotor in the defined rotation direction,
- wherein the driving signal is generated such that it has an electrical lead angle with respect to the position signal in function of the rotation direction of the rotor and on a signal which is indicative for the electrical lead angle,
- wherein the signal indicative for the electrical lead angle is set such that a total lead angle, which is a sum of the lead angle of the position signal and the electrical lead angle, is positive for both rotation directions of the rotor,
- wherein the at least one signal which is indicative for the electrical lead angle is predefined for each rotation direction.

13. The method according to claim 12, the method comprising:
- electrically adjusting the position signal when changing the rotation direction of the rotor, generating the driving signal based on the adjusted position signal such that the electrical lead angle is changing due to changes in the adjusted position signal.

14. A motor driver for driving a rotor of a single coil motor in a clockwise or counterclockwise rotation direction with respect to a stator of the single coil motor,
- the motor driver being adapted for generating a position signal which is representative for an angular position of the rotor with respect to the stator wherein a lead angle of the position signal is the angle with which a zero crossing of the position signal is leading a north/south zero crossing of magnetic poles in the rotor, and
- comprising a controller which comprises a direction input to define the rotation direction of the rotor, and which is adapted for generating a driving signal for rotating the rotor in the defined rotation direction,
- wherein the driving signal is generated such that it has an electrical lead angle with respect to the position signal in function of the rotation direction of the rotor and is based on a signal which is indicative for the electrical lead angle,
- wherein the signal indicative for the electrical lead angle is set such that a total lead angle, which is a sum of the lead angle of the position signal and the electrical lead angle, is positive for both rotation directions of the rotor,
- wherein the at least one signal which is indicative for the electrical lead angle is predefined for each rotation direction,
- wherein the one or more signals which are indicative for the electrical lead angles are determined based on one or more parameters that give an indication of the ratio of the resistance and inductance of the rotor.

* * * * *